Figure 1:
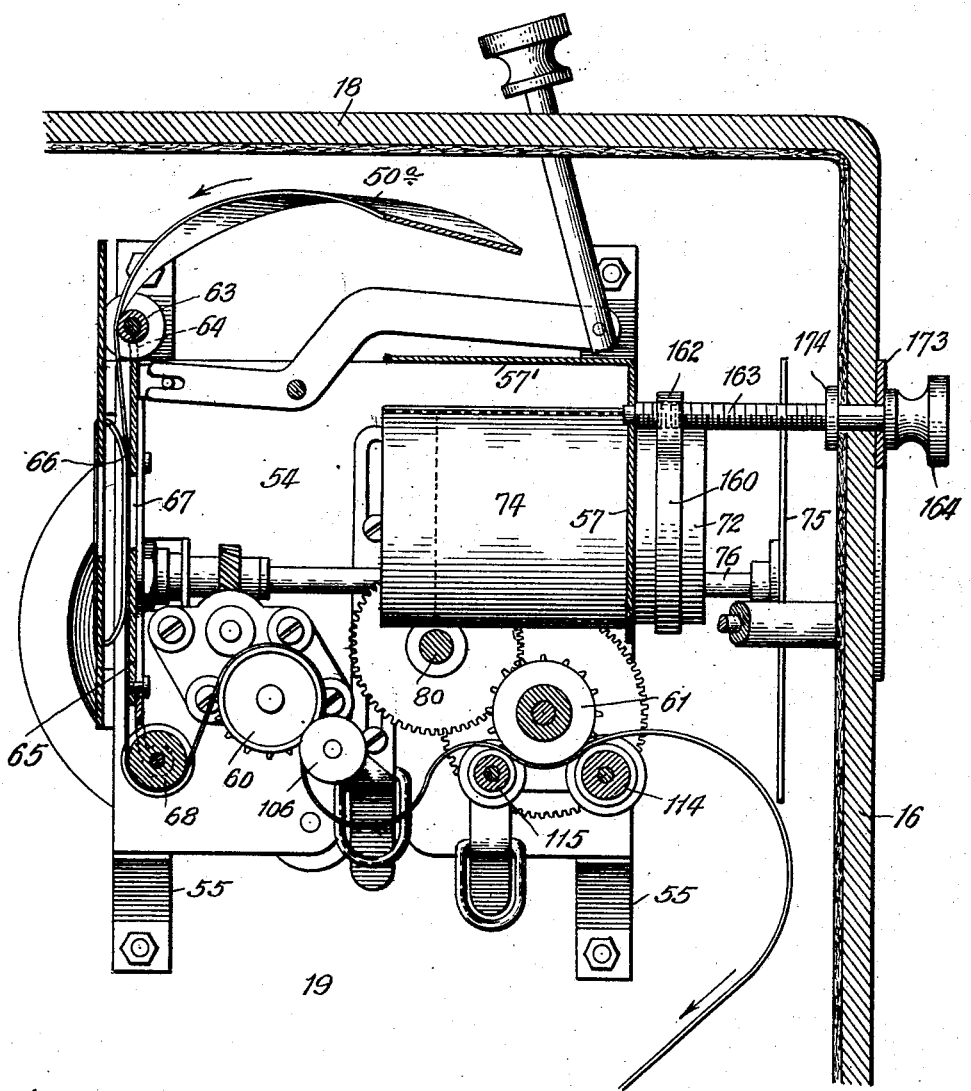

H. A. DE VRY.
MOTION PICTURE MACHINE.
APPLICATION FILED SEPT. 20, 1916.

1,309,087.

Patented July 8, 1919.
2 SHEETS—SHEET 1.

Witness:
John Enders

Inventor:
Herman A. de Vry
by Fred ———
his Atty.

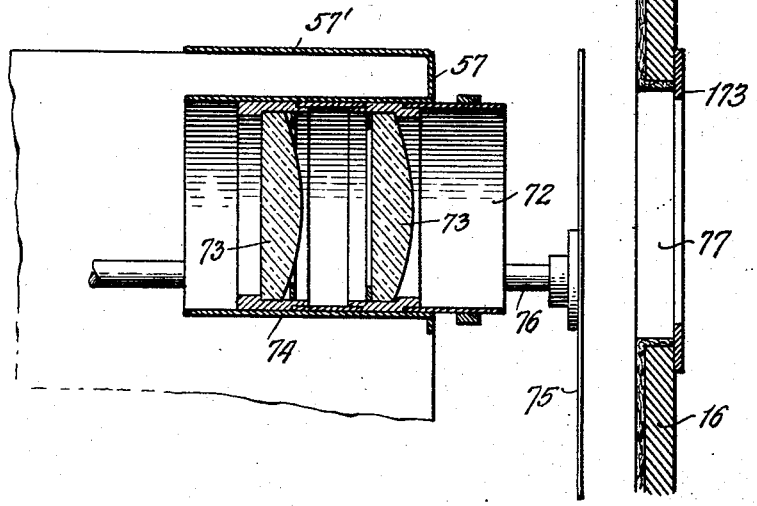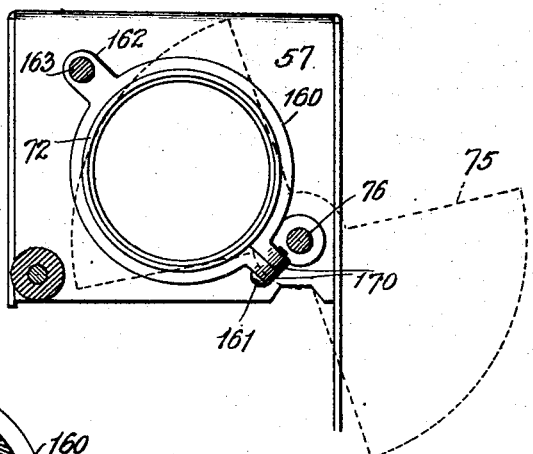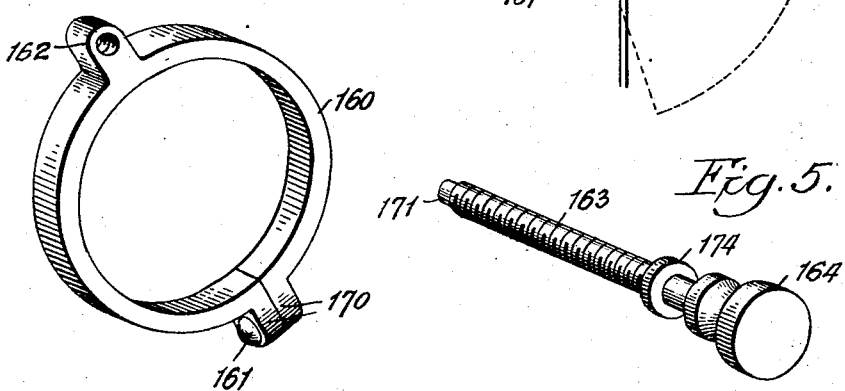

UNITED STATES PATENT OFFICE.

HERMAN A. DE VRY, OF CHICAGO, ILLINOIS, ASSIGNOR TO THE DE VRY CORPORATION, OF CHICAGO, ILLINOIS, A CORPORATION OF ILLINOIS.

MOTION-PICTURE MACHINE.

1,309,087. Specification of Letters Patent. Patented July 8, 1919.

Original application filed August 16, 1915, Serial No. 45,633. Divided and this application filed September 20, 1916. Serial No. 121,113.

*To all whom it may concern:*

Be it known that I, HERMAN A. DE VRY, a citizen of the United States, and a resident of Chicago, in the county of Cook and State of Illinois, have invented certain new and useful Improvements in Motion-Picture Machines, of which the following is a full, clear, and exact description.

The invention relates to motion picture machines and this application is a division of one filed by me August 16, 1915, Serial No. 45,633.

The object of the invention is to provide a motion picture machine with a simple and improved means for adjusting the lens-carrier in the case relatively to the film to focus the picture upon the screen.

The invention consists in the several novel features hereinafter set forth and more particularly defined by claims at the conclusion hereof.

In the drawings: Figure 1 is a vertical section of a portion of a motion picture machine embodying the invention, the lens-carrier and improved mechanism for adjusting it being shown in elevation. Fig. 2 is a section through the lens-carrier and the tubular mount in which it is slidable. Fig. 3 is a front elevation of the lens-carrier. Fig. 4 is a perspective of the clamping ring on the lens-carrier. Fig. 5 is a perspective of the adjusting screw for the lens carrier.

The machine is inclosed within a case comprising a front 16, a top 18 and a side 19. It will be understood that the film supply and take-up spools, feed-mechanism and illuminating means for projecting light through the film are all inclosed within the case and for an exemplification of the supply and take-up spools and illuminating means and a complete case, reference may be had to the aforesaid case Serial No. 45,633. The several parts of the film-feeding mechanism are supported by a frame comprising a plate 54 which is secured by brackets 55 to the side 19 of the case, a front plate 57, a top plate 57′ and a back plate 65. The feed mechanism for the film comprises an intermittent feed sprocket 60 and a continuous take-up sprocket 61. These sprockets are of the double type suitable for a marginally perforated film. The axes of these sprockets are parallel. The film loop 50ª passes to a guide roller 63 which is mounted in lugs 64 on the back plate 65 of the feed mechanism frame. Thence, the film passes downwardly between said plate and resilient strips 66 which hold the film against the back of said plate as it passes across the exposure opening 67 in said plate; thence the film passes under a guide roller 68 mounted at the lower end of a siding framing plate, thence partially around over the intermittent feed sprocket 60 and thence to and under and partially around the take-up sprocket 61 from which it passes to the take-up. A main drive-shaft 80 is journaled in the frame and the feed sprockets are driven by gearing exemplified more fully in the aforesaid application No. 45,633.

An idle roller 106 is adapted to hold the film on the intermittent feed sprocket 60. A pair of flanged rollers 114, 115 hold the film on the take-up sprocket 61.

A tube 72 containing the projecting lenses 73 is slidably mounted in a fixed tube 74 in the front of the opening 67 in the back plate 65. A rotating shutter 75 secured to a shaft 76 moves across the front of the lens tube. An opening 77 is formed in the front of the case and in front of the shutter and the lens-tube 72.

A split clamping ring 160 is secured on and adjacent the front end of the lens-tube, a screw 161 passing through lugs 170 on said ring is adapted to clamp the ring firmly around the lens tube. A screw-threaded ear 162 is formed on this ring and an adjusting screw 163 passes through said ear, has its inner reduced end 171 journaled in the front plate 57, is held against longitudinal movement in front wall 16 of the case and is provided with a thumb wheel 164 outside of the case whereby the screw may be turned to slide the lens-tube 72 in the fixed tube 74 to focus the picture on the screen. The inner end of the thumb wheel 164 abuts against a plate 173 on the outside of the case and a collar 174 fixed to the screw acts as a shoulder to hold the screw against outward movement in the case. This adjusting device for the lens tube exemplifies a simple construction whereby the lens-tube may be adjusted from the outside of the inclosing case which dispenses with the use of gears and which can be readily applied to and removed from the lens-tube whenever it is desired to repair or remove the feed mechanism from the case.

By turning the thumb wheel 164, screw 163, which is screw-threaded to the ear 162, will operate the clamping ring 160 and the lens-tube longitudinally and positively either inwardly or outwardly so that the picture may be readily focused on the screen.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a motion picture machine, the combination of a case, film feeding mechanism in the case, a tubular lens-carrier, a tubular mount in which the lens-carrier is slidably held, a screw for adjusting the lens-carrier extended through the front of the case and substantially parallel with the axis of the lens-carrier, and means on the outside of the case for operating the screw.

2. In a motion picture machine, the combination of a case, film feeding mechanism in the case, a tubular lens carrier, a tubular mount in which the lens-carrier is slidably held, a clamping ring on the carrier and a screw for adjusting the carrier connected to said ring and extended through the front of the case.

3. In a motion picture machine, the combination of a case, film feeding mechanism in the case, a tubular lens-carrier, a tubular mount in which the lens-carrier is slidably held, a split clamping ring on the tube, a screw for clamping the ring on the tube, a screw-threaded lug on the ring and a screw threaded to said lug for adjusting the carrier.

4. In a motion picture machine, the combination of a case, film feeding mechanism in the case, a tubular lens-carrier, a tubular mount in which the lens carrier is slidably held, a split clamping ring on the tube, a screw for clamping the ring on the tube, a screw threaded lug on the ring, and a screw extended through the front of the case and through said lug and held against longitudinal movement therein for adjusting the carrier.

HERMAN A. DE VRY.

Copies of this patent may be obtained for five cents each, by addressing the "Commissioner of Patents, Washington, D. C."